US011366763B2

(12) United States Patent
Kim

(10) Patent No.: US 11,366,763 B2
(45) Date of Patent: Jun. 21, 2022

(54) CONTROLLER INCLUDING CACHE MEMORY, MEMORY SYSTEM, AND OPERATING METHOD THEREOF

(71) Applicant: SK hynix Inc., Gyeonggi-do (KR)

(72) Inventor: Do Hun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/781,309

(22) Filed: Feb. 4, 2020

(65) Prior Publication Data
US 2020/0272571 A1 Aug. 27, 2020

(30) Foreign Application Priority Data

Feb. 27, 2019 (KR) ........................ 10-2019-0023135

(51) Int. Cl.
*G06F 12/0893* (2016.01)
*G06F 12/02* (2006.01)
(52) U.S. Cl.
CPC ...... *G06F 12/0893* (2013.01); *G06F 12/0246* (2013.01); *G06F 2212/305* (2013.01); *G06F 2212/7201* (2013.01); *G06F 2212/7202* (2013.01)
(58) Field of Classification Search
CPC ........... G06F 12/0893; G06F 2212/305; G06F 12/0246; G06F 2212/7202; G06F 2212/7201; G06F 12/0802; G06F 3/0658; G06F 3/0656; G06F 3/0679; G06F 2003/0691; Y02D 10/00
See application file for complete search history.

(56) References Cited

U.S. PATENT DOCUMENTS

| 5,509,132 A | 4/1996 | Matsuda et al. |
| 5,604,753 A | 2/1997 | Bauer et al. |
| 5,841,598 A | 11/1998 | Horiuchi et al. |
| 5,862,083 A | 1/1999 | Tobita et al. |
| 6,078,520 A | 6/2000 | Tobita et al. |
| 6,222,786 B1* | 4/2001 | Holland .................. G11C 8/16 365/49.1 |
| 6,725,333 B1* | 4/2004 | Degenaro ........... G06F 12/0888 711/118 |

(Continued)

FOREIGN PATENT DOCUMENTS

| CN | 105159844 A | 12/2015 |
| KR | 100293276 | 9/2001 |

(Continued)

OTHER PUBLICATIONS

Notice of Allowance issued in corresponding U.S. Appl. No. 16/781,775, dated Aug. 6, 2021, 36 pages,.

(Continued)

*Primary Examiner* — Reginald G Bragdon
*Assistant Examiner* — Sakhr A Aldaylam
(74) *Attorney, Agent, or Firm* — IP & T Group LLP

(57) ABSTRACT

A controller, a memory system and an operating method thereof are disclosed. The controller controls a nonvolatile memory device and the nonvolatile memory includes a first memory module configured to store a plurality of pieces of map data read from the nonvolatile memory device; and a second memory module configured to cache map data having locality among map data received from the first memory module.

5 Claims, 14 Drawing Sheets

(56) References Cited

U.S. PATENT DOCUMENTS

| | | | |
|---|---|---|---|
| 8,046,551 B1 | 10/2011 | Sahin | |
| 8,909,860 B2 | 12/2014 | Rao | |
| 8,930,647 B1 * | 1/2015 | Smith | G06F 30/392 |
| | | | 711/154 |
| 2008/0244153 A1 | 10/2008 | Huang | |
| 2010/0287327 A1 | 11/2010 | Li et al. | |
| 2011/0022779 A1 | 1/2011 | Lund et al. | |
| 2011/0047437 A1 | 2/2011 | Flynn | |
| 2011/0072196 A1 | 3/2011 | Forhan et al. | |
| 2011/0179200 A1 | 7/2011 | Sukonik et al. | |
| 2012/0072702 A1 | 3/2012 | Pierson et al. | |
| 2012/0144448 A1 | 6/2012 | Gunawardena et al. | |
| 2012/0311262 A1 | 12/2012 | Franceschini et al. | |
| 2013/0124794 A1 | 5/2013 | Bux et al. | |
| 2013/0205097 A1 | 8/2013 | Flynn et al. | |
| 2013/0318285 A1 | 11/2013 | Pignatelli | |
| 2014/0059275 A1 | 2/2014 | Yun et al. | |
| 2014/0281806 A1 | 9/2014 | Sharon et al. | |
| 2014/0297603 A1 | 10/2014 | Kim et al. | |
| 2015/0010143 A1 * | 1/2015 | Yang | H04L 9/3249 |
| | | | 380/28 |
| 2015/0117107 A1 | 4/2015 | Sun et al. | |
| 2015/0149742 A1 | 5/2015 | Richter et al. | |
| 2015/0356019 A1 | 12/2015 | Johar et al. | |
| 2015/0370734 A1 | 12/2015 | Mangano et al. | |
| 2016/0006461 A1 | 1/2016 | Yin et al. | |
| 2016/0162416 A1 | 6/2016 | Boyd et al. | |
| 2016/0274820 A1 * | 9/2016 | Suzuki | G06F 13/1668 |
| 2016/0299710 A1 | 10/2016 | Chang et al. | |
| 2016/0328161 A1 | 11/2016 | Huang et al. | |
| 2017/0031615 A1 | 2/2017 | Lee | |
| 2017/0031626 A1 | 2/2017 | Kim et al. | |
| 2017/0131951 A1 | 5/2017 | Miura | |
| 2017/0228155 A1 * | 8/2017 | Shirota | G06F 3/0655 |
| 2017/0242752 A1 | 8/2017 | Lee | |
| 2018/0004698 A1 | 1/2018 | Brouwer et al. | |
| 2018/0006963 A1 | 1/2018 | Brouwer et al. | |
| 2018/0130537 A1 | 5/2018 | Kim et al. | |
| 2018/0253353 A1 | 9/2018 | Takase | |
| 2018/0275898 A1 | 9/2018 | Bhansali et al. | |
| 2018/0374550 A1 | 12/2018 | Barndt et al. | |
| 2019/0065072 A1 | 2/2019 | Dirik et al. | |
| 2019/0073129 A1 | 3/2019 | Anderson et al. | |
| 2019/0073142 A1 | 3/2019 | Ash et al. | |
| 2019/0073317 A1 | 3/2019 | Anderson et al. | |
| 2019/0087345 A1 * | 3/2019 | Hijaz | G06F 11/34 |
| 2019/0129654 A1 | 5/2019 | Kim | |
| 2019/0129971 A1 | 5/2019 | Hironaka et al. | |
| 2019/0205257 A1 | 7/2019 | Kim | |
| 2019/0377679 A1 * | 12/2019 | Murphy | G06F 12/0811 |
| 2020/0272362 A1 * | 8/2020 | Kim | G06F 3/068 |

FOREIGN PATENT DOCUMENTS

| | | |
|---|---|---|
| KR | 10-1014040 B1 | 2/2011 |
| KR | 10-2015-0138713 A | 12/2015 |
| KR | 10-2016-0035737 A | 4/2016 |
| KR | 101711945 | 3/2017 |
| KR | 10-2017-0070920 A | 6/2017 |
| KR | 10-1790165 B1 | 11/2017 |
| KR | 10-1858159 B1 | 6/2018 |
| KR | 10-2018-0104830 A | 9/2018 |
| KR | 10-2019-0054974 A | 5/2019 |
| KR | 10-2019-0067088 A | 6/2019 |
| KR | 10-1992934 B1 | 6/2019 |
| KR | 10-2019-0082584 A | 7/2019 |
| KR | 10-2002925 B1 | 7/2019 |
| KR | 10-2020-0095103 A | 8/2020 |

OTHER PUBLICATIONS

Office Action issued in Chinese Patent Application No. 201810554611.9, dated Sep. 3, 2021, 14 pages.

* cited by examiner

CONTROLLER INCLUDING CACHE MEMORY, MEMORY SYSTEM, AND OPERATING METHOD THEREOF

CROSS-REFERENCES TO RELATED APPLICATION

The present application claims priority under 35 U.S.C. § 119(a) to Korean application number 10-2019-0023135, filed on Feb. 27, 2019, which is incorporated herein by reference in its entirety.

BACKGROUND

1. Technical Field

Various embodiments may generally relate to a semiconductor device, and more particularly, to a controller, a memory system and an operating method thereof.

2. Related Art

In recent years, the paradigm for computer environments changed to ubiquitous computing which may use computer systems anytime and anywhere. As a result, the use of portable electronic apparatuses such as a mobile phone, a digital camera, and a laptop computer has been increasing rapidly. Generally, portable electronic apparatuses use memory systems that employ memory devices. Memory systems may be used to store data used in the portable electronic apparatuses.

Memory systems using memory devices have no mechanical driving units and exhibit good stability and endurance, a fast information access rate, and low power consumption. Such memory systems may include a universal serial bus (USB) memory device, a memory card having various interfaces, a universal flash storage (UFS) device, a solid state drive (SSD), and the like.

SUMMARY

Embodiments are provided to technology capable of improving performance of a memory system.

Embodiments are provided to technology capable of increasing a cache hit of a memory system.

In an embodiment of the present disclosure, a controller which controls a nonvolatile memory device may include: a first memory module configured to store a plurality of pieces of map data read from the nonvolatile memory device; and a second memory module configured to cache map data having locality among map data received from the first memory module.

In an embodiment of the present disclosure, an operating method of a controller which controls a nonvolatile memory device may include: transmitting target map data among a plurality of pieces of map data stored in a first memory module to a second memory module; determining whether the target map data has locality; and caching the target map data in the second memory module when the target map data is determined to have the locality.

In an embodiment of the present disclosure, a memory system may include: a nonvolatile memory device; and a controller configured to control the nonvolatile memory device. The nonvolatile memory device reads a plurality of pieces of map data stored therein and transmits the plurality of pieces of map data to the controller. The controller may a first memory module configured to store the plurality of pieces of map data read from the nonvolatile memory device and a second memory module configured to cache map data having locality among map data received from the first memory module.

In an embodiment of the present disclosure, an operating method of a memory system which includes a nonvolatile memory device and a controller configured to control the nonvolatile memory device, the method may include: storing a plurality of pieces of map data read from the nonvolatile memory device in a first memory module included in the controller; transmitting target map data among the plurality of pieces of map data stored in the first memory module to a second memory module Included in the controller; determining whether the target map data has locality; and caching the target map data in the second memory module when the target map data is determined to have the locality.

In an embodiment of the present disclosure, an operating method of a controller for controlling a memory device storing plural pieces of map data, the operating method may include caching the map data into a first memory, caching, into a second memory, one or more pieces from the map data cached in the first memory, accessing the memory device by referring to the map data cached in the second memory, accessing the memory device by referring to the map data cached in the first memory upon a cache-miss of the second memory. The one or more pieces cached into the second memory have locality.

In accordance with an embodiment of the present disclosure, the performance of a memory system can be improved.

In accordance with an embodiment of the present disclosure, the cache hit rate of a memory system can be increased.

These and other features, aspects, and embodiments are described below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plane illustrations of exemplary embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
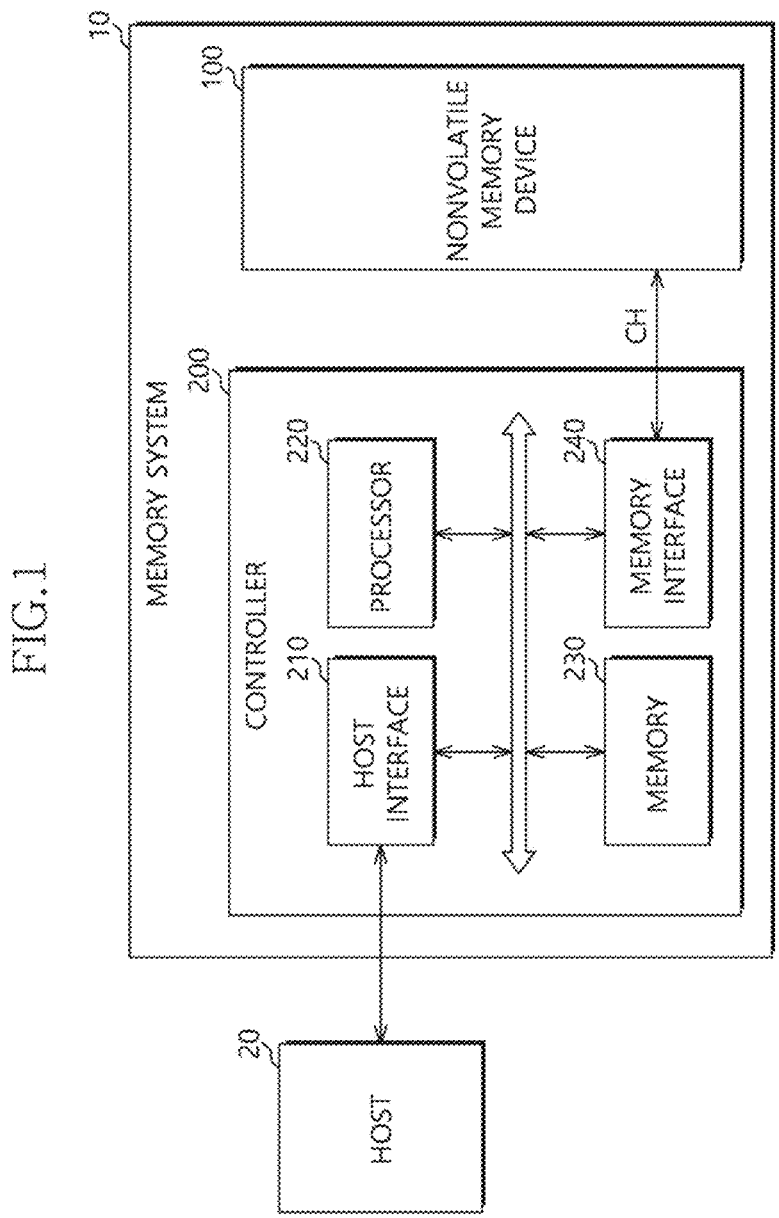
FIG. 1 is a diagram illustrating a configuration of a memory system in accordance with an embodiment of the present disclosure.

FIG. 1 is a diagram illustrating a configuration of a memory system 10 in accordance with an embodiment.

Referring to FIG. 1, the memory system 10 in accordance with an embodiment may store data to be accessed by a host 20 such as a mobile phone, an MP3 player, a laptop computer, a desktop computer, a game player, a television (TV), an in-vehicle infotainment system, and the like.

The memory system 10 may be manufactured as any one among various types of storage devices in accordance with an interface protocol coupled to the host 20. For example, the memory system 10 may be configured of any one of various types of storage devices, such as a solid state drive (SSD), a multimedia card in the form of MMC, eMMC, RS-MMC, and micro-MMC, a secure digital card in the form of SD, mini-SD, and micro-SD, a universal serial bus (USB) storage device, a universal flash storage (UFS) device, a personal computer memory card international association (PCMCIA) card type storage device, a peripheral component interconnection (PCI) card type storage device, a PCI-express (PCIe) card type storage device, a compact flash (CF) card, a smart media card, a memory stick, and the like.

The memory system 10 may be manufactured as any one among various types of packages. For example, the memory system 10 may be manufactured as any one of various types of packages, such as a package on package (POP), a system in package (SIP), a system on chip (SOC), a multi-chip package (MCP), a chip on board (COB), a wafer-level fabricated package (WFP), and a wafer-level stack package (WSP).

The memory system 10 may include a nonvolatile memory device 100 and a controller 200.

The nonvolatile memory device 100 may be operated as a storage medium of the memory system 10. The nonvolatile memory device 100 may include any one of various types of nonvolatile memory devices according to a memory cell, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (ReRAM) using a transition metal compound.

Although it has been illustrated in FIG. 1 that the memory system 10 includes one nonvolatile memory device 100 for clarity, the memory system 10 may include a plurality of nonvolatile memory devices and the present disclosure may be equally applied to the memory system 10 including the plurality of nonvolatile memory devices.

The nonvolatile memory device 100 to be described later in detail with reference to FIG. 14 may include a memory cell array 110 including a plurality of memory cells MC arranged in regions in which a plurality of word lines WL1 to WLm and a plurality of bit lines BL1 to BLn cross each other. The memory cell array 110 may include a plurality of memory blocks and each of the plurality of memory blocks may include a plurality of pages.

For example, each of the memory cells in the memory cell array may be a single level cell (SLC) in which a single bit data (for example, 1-bit data) is to be stored and a multi level cell (MLC) in which 2-bit or more data is to be stored. The MLC may store 2-bit data, 3-bit data, 4-bit data, and the like. In general, a memory cell in which 2-bit data is to be stored may refer to a MLC, a memory cell in which 3-bit data is to be stored may refer to a triple level cell (TLC), and a memory cell in which 4-bit data is to be stored may refer to a quadruple level cell (QLC). However, for clarity, the memory cells in which the 2-bit to 4-bit data are to be stored may collectively refer to the MLC in the embodiment.

The memory cell array 110 may include at least one or more memory cells of the SLC and the MLC. The memory cell array 110 may include memory cells arranged in a two-dimensional (2D) horizontal structure or memory cells arranged in a 3D vertical structure.

The controller 200 may control an overall operation of the memory system 10 through driving of firmware or software loaded into a memory 230. The controller 200 may decode and drive a code-type instruction or algorithm such as firmware or software. The controller 200 may be implemented with hardware or a combination of hardware and software.

The controller 200 may include a host interface 210, a processor 220, the memory 230, and a memory interface 240. Although not shown in FIG. 1, the controller 200 may further include an error correction code (ECC) engine which generates a parity by performing ECC encoding on write data provided from the host 20 and performs ECC decoding on read data read out from the nonvolatile memory device 100 using the parity.

The host interface 210 may perform interfacing between the host 20 and the memory system 10 according to a protocol of the host 20. For example, the host interface 210 may communicate with the host 20 through any one protocol among a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCIe protocol.

The processor 220 may be configured of a micro control unit (MCU) and a central processing unit (CPU). The processor 220 may process requests transmitted from the host 20. To process the request transmitted from the host 20, the processor 220 may drive a code-type instruction or algorithm (for example, firmware) loaded into the memory 230 and control internal function blocks such as the host interface 210, the memory 230, the memory interface 240 and the nonvolatile memory device 100.

The processor 220 may generate control signals for controlling operations of the nonvolatile memory device 100 based on the requests transmitted from the host 20 and provide the generated control signals to the nonvolatile memory device 100 through the memory interface 240.

The memory 230 may be configured of a random access memory such as a dynamic random access memory (DRAM) or a static random access memory (SRAM). The memory 230 may store the firmware driven through the processor 220. The memory 230 may also store data (for example, meta data) required for driving the firmware. For example, the memory 230 may be operated as a working memory of the processor 220.

The memory 230 may include a data buffer configured to temporarily store write data to be transmitted to the nonvolatile memory device 100 from the host 20 or read data from the nonvolatile memory device 100 to be transmitted to the host 20. For example, the memory 230 may be operated as a buffer memory of the processor 220. The memory 230 may receive the map data from the nonvolatile memory device 100 and store the received map data therein, during booting of the memory system 10.

The memory interface 240 may control the nonvolatile memory device 100 according to control of the processor 220. The memory interface 240 may refer to a memory controller. The memory interface 240 may provide control signals to the nonvolatile memory device 100. The control signals may include a command, an address, and an operation control signal for controlling the nonvolatile memory device 100. The memory interface 240 may provide data stored in the data buffer to the nonvolatile memory device 100 or store data transmitted from the nonvolatile memory device 100 in the data buffer.

The controller may further include a map cache (not shown) configured to cache map data referenced by the processor 220 among the map data stored in the memory 230.

FIGS. 2 to 5 are diagrams describing operations of a memory system in accordance with an embodiment.

Referring to FIGS. 2 to 5, the controller 200 in accordance with an embodiment may include a first memory module 231 configured to store a plurality of pieces of map data received from the nonvolatile memory device 100 and a second memory module 232 configured to cache at least one piece of map data among the plurality of pieces of map data stored in the first memory module 231.

Figure 2:
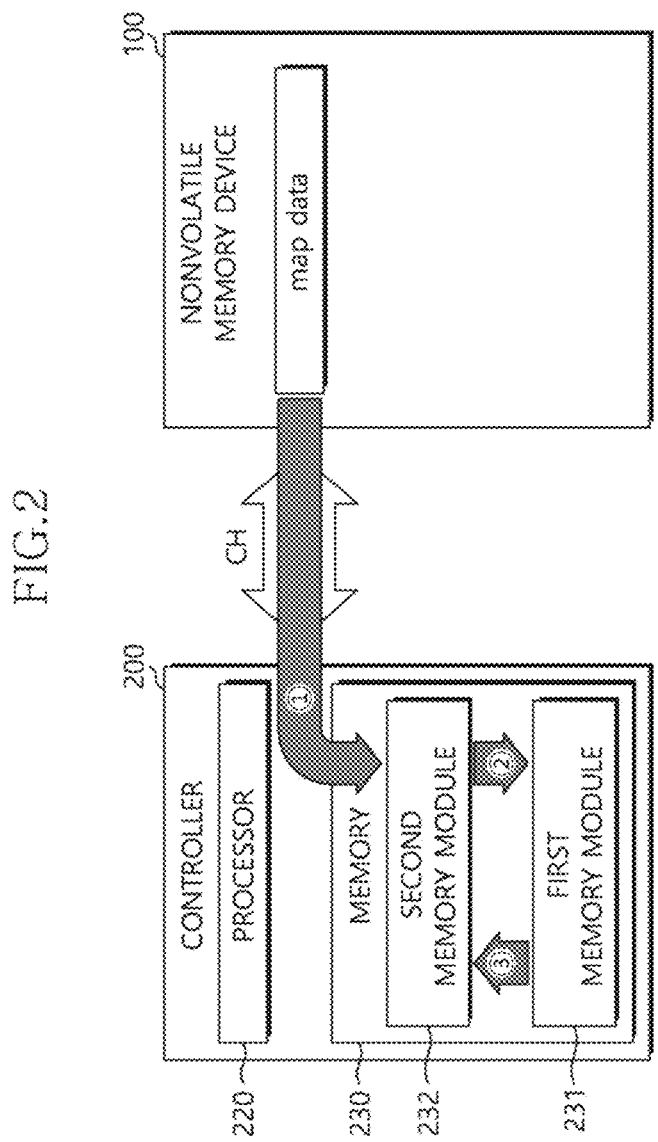
FIGS. 2 to 5 are diagrams describing operations of a memory system in accordance with an embodiment of the present disclosure.

For example, referring to FIG. 2, the nonvolatile memory device 100 may read a plurality of pieces of map data stored in a system region and transmit the plurality of pieces of map data read to the controller 200, during booting of the memory system 10. The controller 200 may receive the plurality of pieces of map data from the nonvolatile memory device 100 and store the received map data in the memory 230 (①). That is, the controller 200 may cache the plurality of pieces of map data into the first memory module 231.

In an embodiment, the second memory module 232 may include a memory error correction code (ECC) engine (not shown). For example, the memory 230 may add a parity to the plurality of pieces of map data by performing encoding on the plurality of pieces of map data through the memory ECC engine of the second memory module 232 and transmit the plurality of pieces of map data, to which the parity is added, to the first memory module 231 from the second memory module 232 (②).

In an embodiment, the second memory module 232 may be a static random access memory (SRAM) module.

In an embodiment, the first memory module 231 may store the plurality of pieces of map data received from the second memory module 232.

In an embodiment, the first memory module 231 may be a dynamic random access memory (DRAM) module.

The memory 230 may transmit at least one piece of map data (e.g., target map data required for access to the nonvolatile memory device 100) among the plurality of pieces of map data cached in the first memory module 231 to the second memory module 232. The second memory module 232 may cache the at least one piece of map data received from the first memory module 231.

In an embodiment, the second memory module 232 may perform decoding on the at least one piece of map data received from the first memory module 231 using the memory ECC engine and cache the decoded map data (③).

Figure 3:
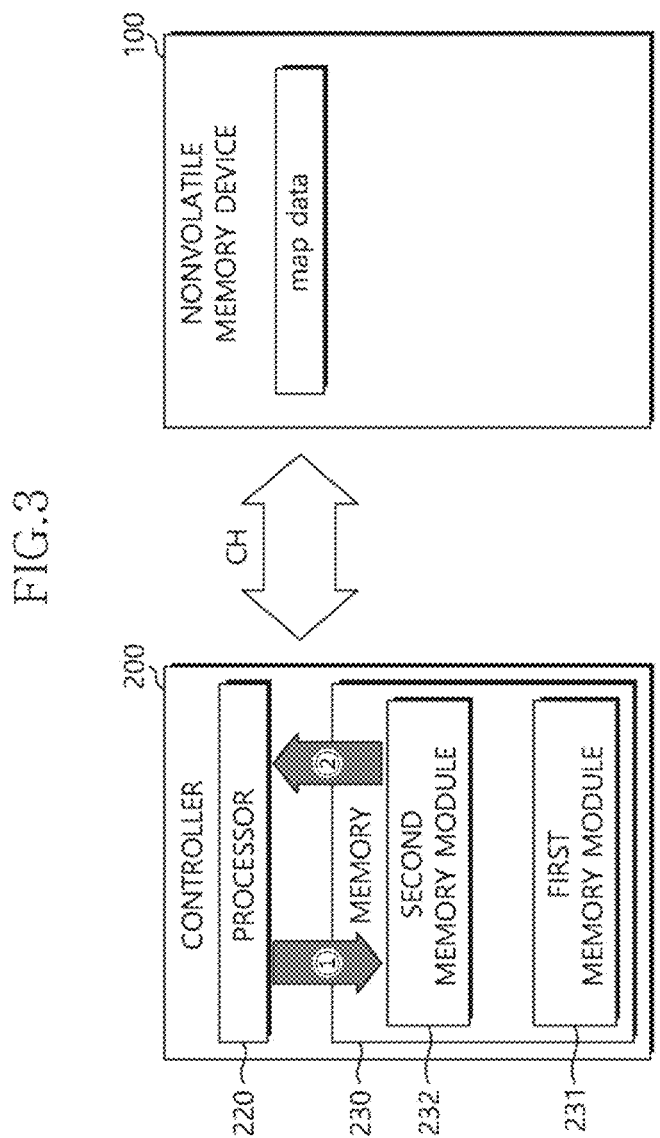

Referring to FIG. 3, when the memory system 10 receives a read request from the host 20, the controller 200 may inquire whether target map data, which is map data for performing the read request, is cached in the second memory module 232 (①). When the target map data is cached in the second memory module 232 (i.e., in the case of cache-hit of the second memory module 232), the processor 220 may receive the target map data cached in the second memory module 232 and perform the requested read operation with reference to the received target map data (②).

Figure 4:
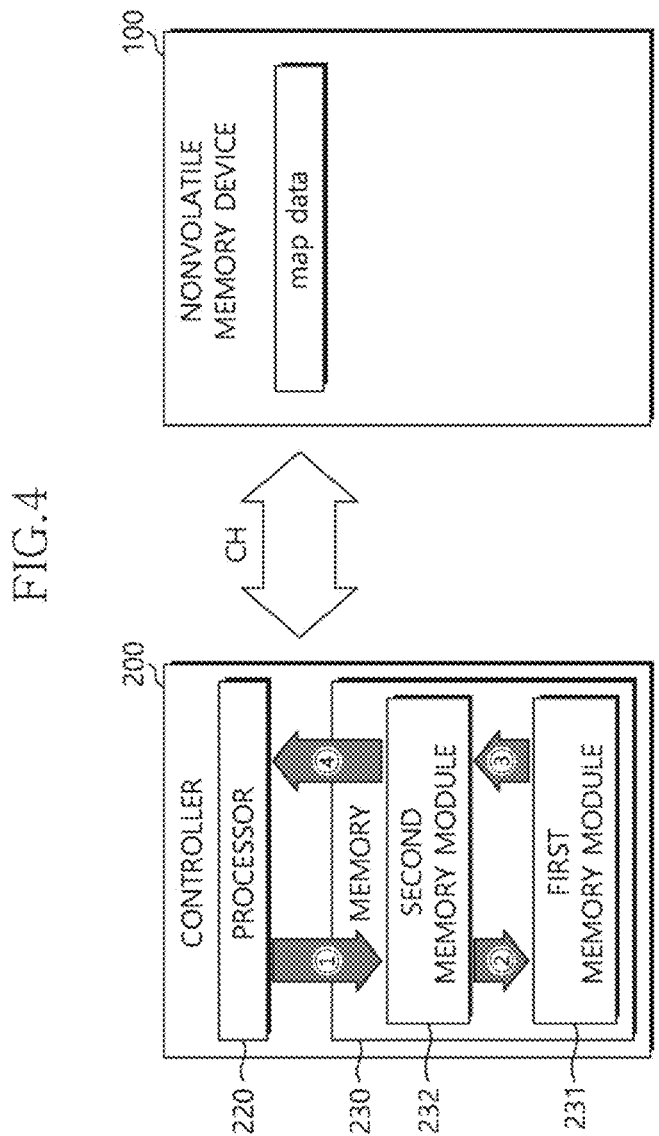

Referring to FIG. 4, when the memory system 10 receives the read request from the host 20, the controller 200 may inquire whether the target map data, which is the map data for performing the read request, is cached in the second memory module 232 (①). When the target map data is not cached in the second memory module 232 (i.e., in the case of cache-miss of the second memory module 232), the memory 230 may inquire of the first memory module 231 (②) and transmit the target map data stored in the first memory module 231 to the processor 220 (③). The processor 220 may perform the requested read operation based on the target map data received from the memory 230 (④).

In an embodiment, the second memory module 232 may cache the target map data when the target map data received from the first memory module 231 has locality. The memory 230 may transmit the target map data cached in the second memory module 232 to the processor 220.

In an embodiment, when the target map data received from the first memory module 231 does not have the locality, the second memory module 232 may not cache the target map data. The memory 230 may transmit the target map data to the processor 220 from the second memory module 232.

In an embodiment, the second memory module 232 may perform decoding on the target map data received from the first memory module 231 and the memory 230 may transmit the decoded target map data to the processor from the second memory module 232.

Figure 5:
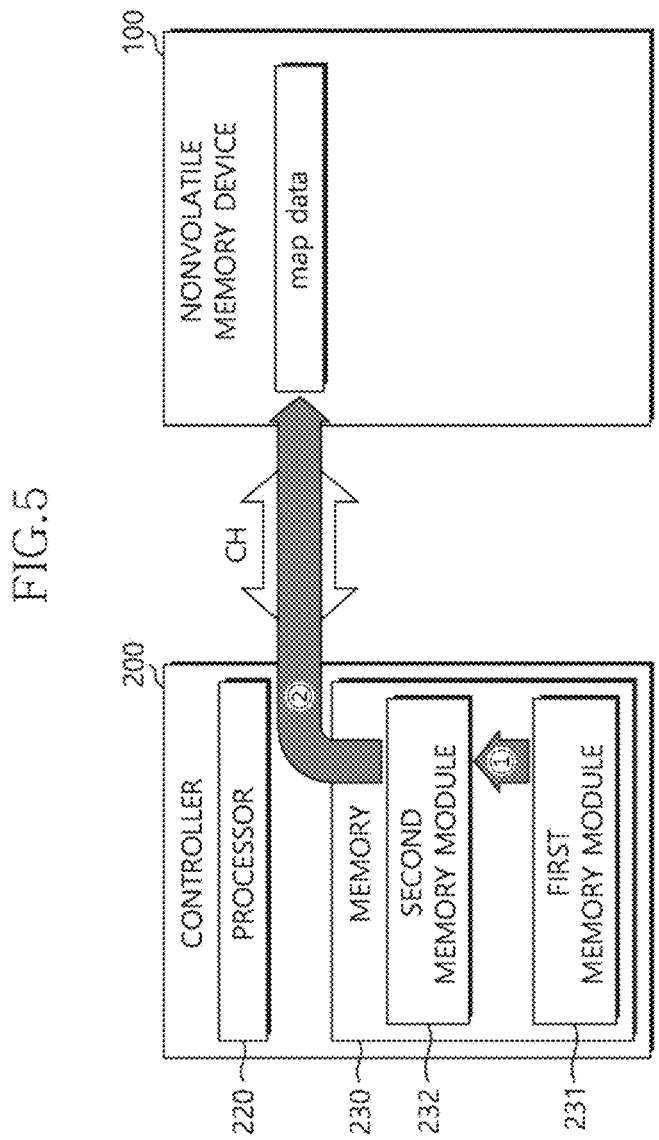

Referring to FIG. 5, when the number of times a write operation requested by the host 20 is performed is greater than a preset number, the controller 200 may perform a meta data write operation. The memory 230 may transmit the plurality of pieces of map data stored in the first memory module 231 to the nonvolatile memory device 100. The nonvolatile memory device 100 may store the plurality of pieces of map data received from the controller 200 in the system region.

In an embodiment, the memory 230 may transmit the plurality of pieces of map data stored in the first memory module 231 to the second memory module 232 (①) and the second memory module 232 may transmit the plurality of pieces of map data received from the first memory module 231 to the nonvolatile memory device 100 (②). For example, the second memory module 232 may perform decoding on the plurality of pieces of map data received from the first memory module 231 and transmit the plurality of pieces of map data decoded to the nonvolatile memory device 100.

Figure 6:
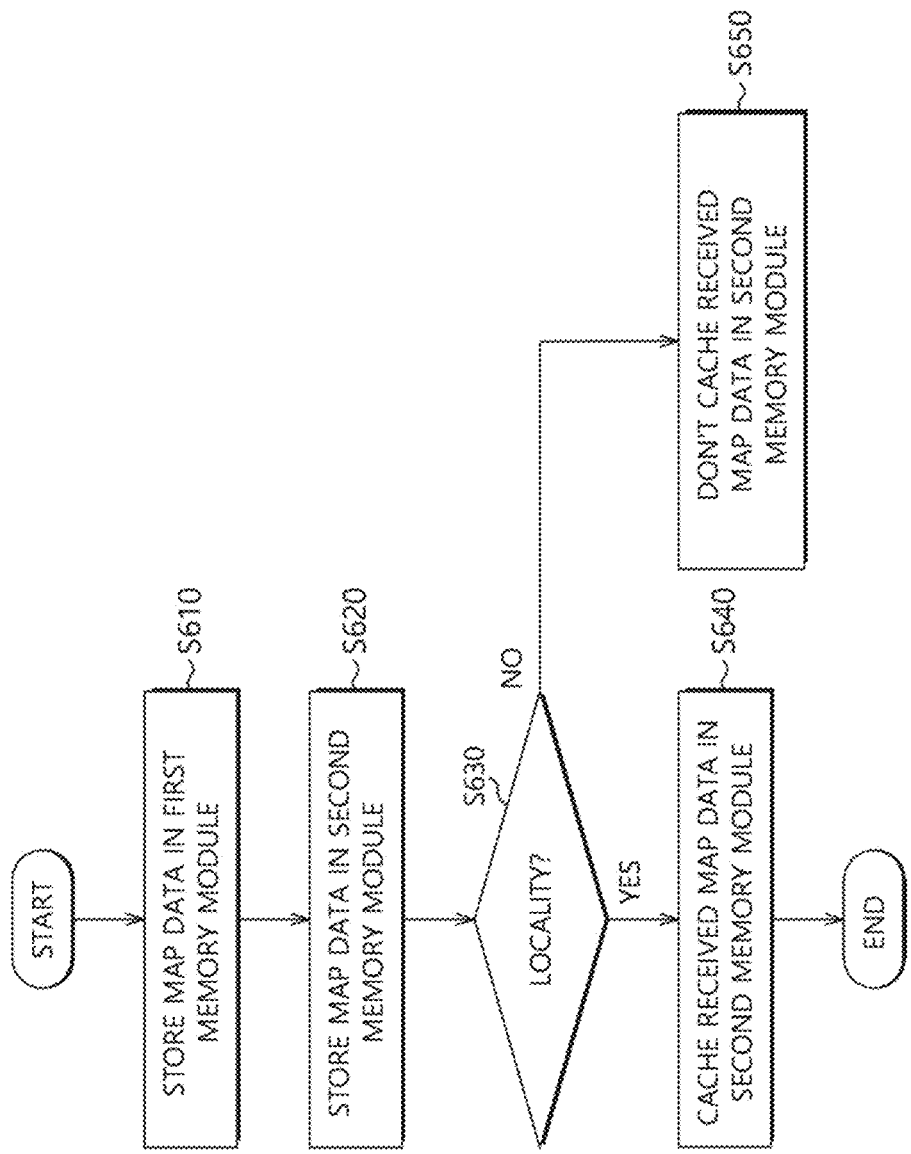
FIGS. 6 to 8 are diagrams describing operating methods of a memory system in accordance with an embodiment of the present disclosure.

FIG. 6 is a diagram describing an operating method of a memory system in accordance with an embodiment.

Referring to FIG. 6, in operation S610, the memory 230 may store (i.e., cache) the plurality of pieces of map data received from the nonvolatile memory device 100 in the first memory module 231.

In an embodiment, the memory 230 may add a parity to the plurality of pieces of map data by performing encoding on the plurality of pieces of map data through the second memory module 232, and store the plurality of pieces of map data, to which the parity is added, in the first memory module 231.

In operation S620, the memory 230 may transmit at least one piece of map data among the plurality of pieces of map data stored in the first memory module 231 to the second memory module 232 from the first memory module 231. The second memory module 232 may perform decoding on the plurality of pieces of map data received from the first memory module 231.

In operation S630, the second memory module 232 may determine whether the at least one piece of map data received from the first memory module 231 has the locality.

In an embodiment, the locality of the map data may mean map data corresponding to data which has a high possibility to be referenced again and may refer to any one of temporal locality, which is map data corresponding to pre-referenced data, and spatial locality, which is spatial adjacency to an address in which the pre-referenced data is stored. The host may have a tendency to sequentially read or write data. This is known as spatial locality of data. Furthermore, the host may have a tendency to access data that has been once accessed again within a relatively short time. This is known as a temporal locality of data.

In an embodiment, the second memory module 232 may determine whether the at least one piece of map data or the target map data has the locality based on information about whether the target map data has the locality, the information being included in a signal received from the processor 220. For example, when the processor 220 transmits the signal to the second memory module 232 according to an advanced extensible interface (AXI) protocol, the processor 220 may transmit the signal, which includes the information about whether the target map data has the locality in an available AXI user signal bit region through user definition, to the second memory module 232. The second memory module 232 may determine whether the target map data has the locality according to a bit indicating whether the target map data has the locality, the bit being included in the signal.

In an embodiment, the second memory module 232 may determine whether the target map data has the locality based on a bit indicating whether the target map data has the locality, the bit being included in the map data. The bit indicating whether the target map data has the locality may be included in the map data by the processor 220.

In operation S640, when the target map data received from the first memory module 231 has the locality, the second memory module 232 may cache the target map data.

In an embodiment, the second memory module 232 may replace at least one piece of map data among the previously cached map data with a currently received target map data and cache the target map data.

In an embodiment, the second memory module 232 may perform decoding on the target map data received from the first memory module 231 and then cache the decoded target map data.

In operation S650, when the target map data received from the first memory module 231 does not have the locality, the second memory module 232 may not cache the target map data.

Figure 7:
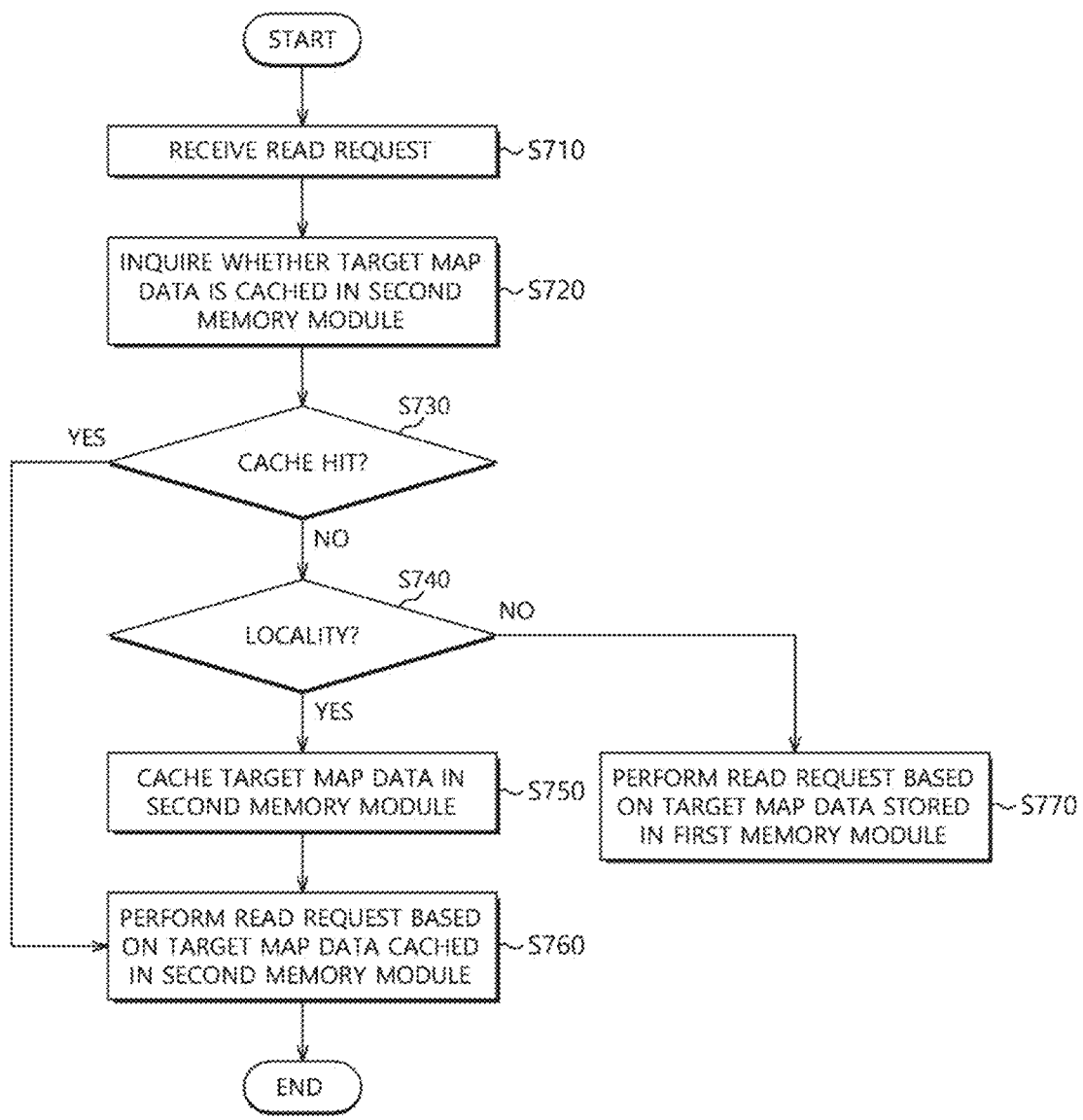

FIG. 7 is a diagram describing an operating method of a memory system in accordance with an embodiment.

Referring to FIG. 7, in operation S710, the memory system 10 may receive a read request from the host 20.

In operation S720, the controller 200 may inquire whether the target map data, which is the map data for performing the read operation requested by the host 20, is cached in the second memory module 232.

In operation S730, the controller 200 may inquire whether the target map data is cached in the second memory module 232 and the controller 200 may determine a case where the target map data is cached as a cache hit and determine a case where the target map data is not cached as a cache miss.

In operation S740, the controller 200 may transmit the target map data stored in the first memory module 231 to the second memory module 232 in the case of a cache miss. The second memory module 232 may determine whether the target map data has the locality.

In operation S750, when the target map data has the locality as a determination result in operation S740, the second memory module 232 may cache the received target map data.

In an embodiment, the second memory module 232 may replace at least one piece of map data among the previously cached map data with the target map data and cache the target map data.

In an embodiment, the second memory module 232 may perform decoding on the target map data received from the first memory module 231 and cache the decoded target map data.

In operation S760, the controller 200 may perform the read operation requested by the host 20 based on the target map data cached in the second memory module 232.

In operation S770, when the target map data does not have the locality as the determination result in operation S740, the controller 200 may perform the read operation requested by the host 20 based on the target map data stored in the first memory module 231.

In an embodiment, the controller 200 may transmit the target map data stored in the first memory module 231 to the second memory module 232, perform decoding on the target map data through the second memory module 232, and perform the read request requested by the host 20 based on the decoded target map data.

Figure 8:
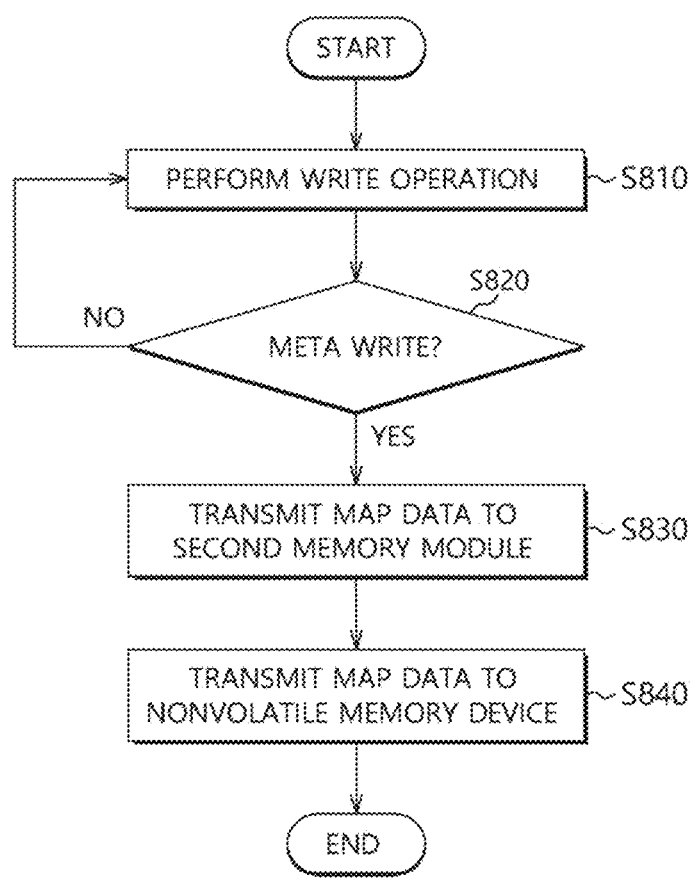

FIG. 8 is a diagram describing an operating method of a memory system in accordance with an embodiment.

Referring to FIG. 8, in operation S810, the memory system 10 may receive a write request from the host 20 and perform the write operation according to the received write request.

In operation S820, the controller 200 may determine whether or not to perform a meta data write operation. For example, when the number of times the write operation is performed according to a request of the host 20 is greater than a preset number, the controller 200 may start the meta data write operation for storing meta data (for example, map data and the like) stored in the memory 230 in the nonvolatile memory device 100.

In operation S830, the memory 230 may transmit a plurality of pieces of map data stored in the first memory module 231 to the second memory module 232.

In operation S840, the memory 230 may transmit the plurality of pieces of map data from the second memory module 232 to the nonvolatile memory device 100. For example, the memory 230 may transmit the plurality of pieces of map data stored in the second memory module 232 to the nonvolatile memory module 100.

In an embodiment, the second memory module 232 may not cache the plurality of pieces of map data received from the first memory module 231. This is because the locality of the plurality of pieces of map data transmitted to the second memory module 232 from the first memory module 231 does not exist in the meta data write operation.

In an embodiment, the second memory module 232 may perform decoding on the plurality of pieces of map data received from the first memory module 231 and transmit the plurality of pieces of map data decoded to the nonvolatile memory device 100.

Figure 9:
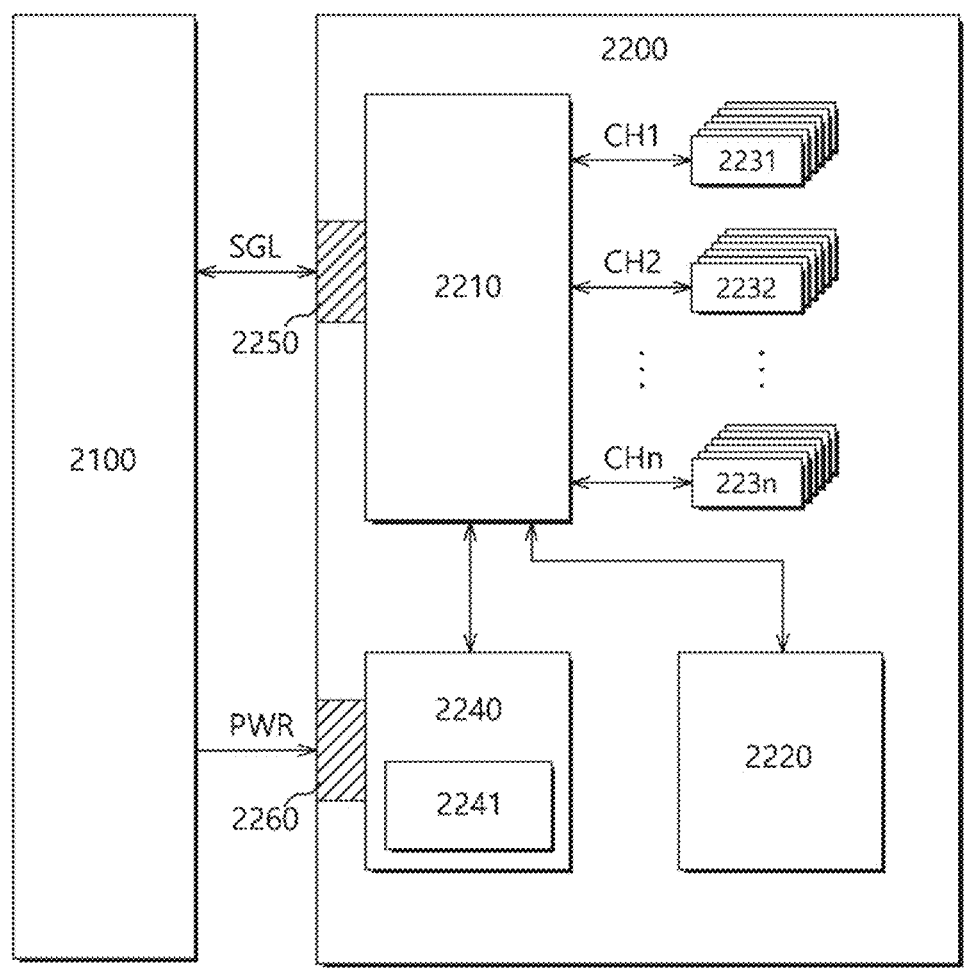
FIG. 9 is a diagram illustrating a data processing system including a solid state drive (SSD) in accordance with an embodiment of the present disclosure.

FIG. 9 is a block diagram illustrating a data processing system including a solid state drive (SSD) in accordance with an embodiment. Referring to FIG. 9, a data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2200.

The buffer memory device 2220 may temporarily store data which are to be stored in the nonvolatile memory devices 2231 to 223n. Further, the buffer memory device 2220 may temporarily store data which are read out from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to one channel may be coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be normally terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured of various types of connectors according to an interface scheme between the host 2100 and the SSD 2200.

Figure 10:
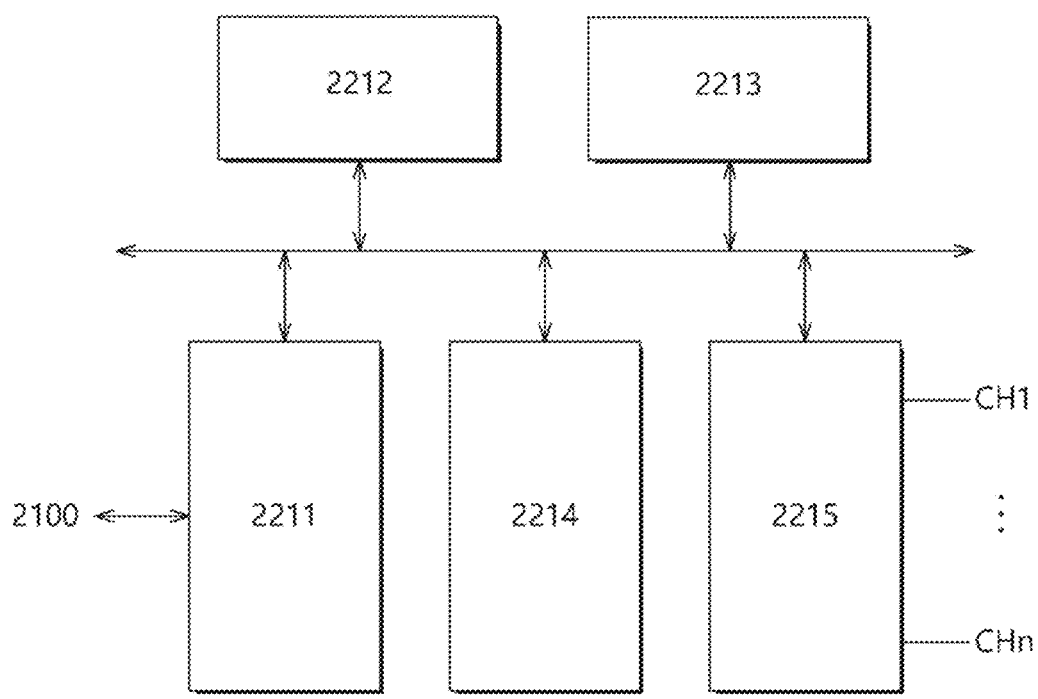
FIG. 10 is a diagram illustrating a configuration of a controller in FIG. 9.

FIG. 10 is a block diagram illustrating an example of the controller illustrated in FIG. 9. Referring to FIG. 10, the controller 2210 may include a host interface unit 2211, a control unit 2212, a random access memory 2213, an error correction code (ECC) unit 2214, and a memory interface unit 2215.

The host interface unit 2211 may provide interfacing between the host 2100 and the SSD 2200 according to a protocol of the host 2100. For example, the host interface unit 2211 may communicate with the host 2100 through any one among SD, USB, MMC, embedded MMC (eMMC), PCMCIA, PATA, SATA, SCSI, SAS, PCI, PCIe, and UFS protocols. In addition, the host interface unit 2211 may perform a disk emulating function of supporting the host 2100 to recognize the SSD 2200 as a general-purpose memory system 10, for example, a hard disk drive (HDD).

The control unit 2212 may analyze and process the signal SGL inputted from the host 2100. The control unit 2212 may control operations of internal function blocks according to firmware or software for driving the SSD 2200. The random access memory 2213 may be used as a working memory for driving such firmware or software.

The ECC unit 2214 may generate parity data for data to be transmitted to the nonvolatile memory devices 2231 to 223n. The generated parity data may be stored, along with the data, in the nonvolatile memory devices 2231 to 223n. The ECC unit 2214 may detect errors of data read out from the nonvolatile memory devices 2231 to 223n based on the parity data. When the detected errors are within a correctable range, the ECC unit 2214 may correct the detected errors.

The memory interface unit 2215 may provide control signals such as commands and addresses to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read out from the nonvolatile memory devices 2231 to 223n to the buffer memory device 2220.

Figure 11:
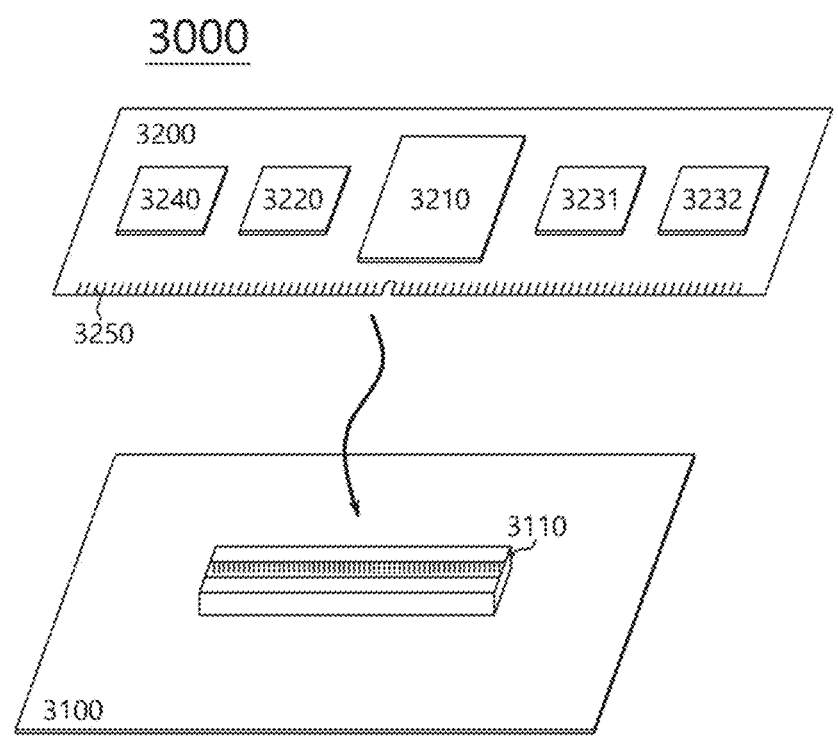
FIG. 11 is a diagram illustrating a data processing system including a memory system in accordance with an embodiment of the present disclosure.

FIG. 11 is a diagram illustrating an example of a data processing system including a memory system in accordance with an embodiment. Referring to FIG. 11, a data processing system 3000 may include a host 3100 and a memory system 3200.

The host 3100 may be configured in the form of a board such as a printed circuit board. Although not shown in FIG. 11, the host 3100 may include internal function blocks for performing functions of the host.

The host 3100 may include a connection terminal 3110 such as a socket, a slot or a connector. The memory system 3200 may be mounted on the connection terminal 3110.

The memory system 3200 may be configured in the form of a board such as a printed circuit board. The memory system 3200 may refer to a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the memory system 3200. The controller 3210 may be configured in the same manner as the controller 2210 shown in FIG. 10.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host 3100. Through the connection terminal 3250, signals such as commands, addresses, data and power may be transferred between the host 3100 and the memory system 3200. The connection terminal 3250 may be configured as various types depending on an interface scheme between the host 3100 and the memory system 3200. The connection terminal 3250 may be disposed on any one side of the memory system 3200.

Figure 12:
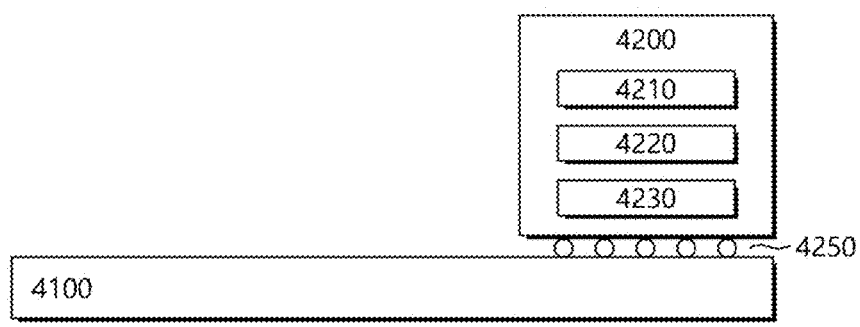
FIG. 12 is a diagram illustrating a data processing system including a memory system in accordance with an embodiment of the present disclosure.

FIG. 12 is a block diagram illustrating an example of a data processing system including a memory system in accordance with an embodiment. Referring to FIG. 12, a data processing system 4000 may include a host 4100 and a memory system 4200.

The host 4100 may be configured in the form of a board such as a printed circuit board. Although not shown in FIG. 12, the host 4100 may include internal function blocks for performing functions of the host.

The memory system 4200 may be configured in the form of a surface-mounting type package. The memory system 4200 may be mounted on the host 4100 through solder balls 4250. The memory system 4200 may include a controller 4210, a buffer memory device 4220, and a nonvolatile memory device 4230.

The controller 4210 may control an overall operation of the memory system 4200. The controller 4210 may be configured in the same manner as the controller 2210 shown in FIG. 10.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 13:
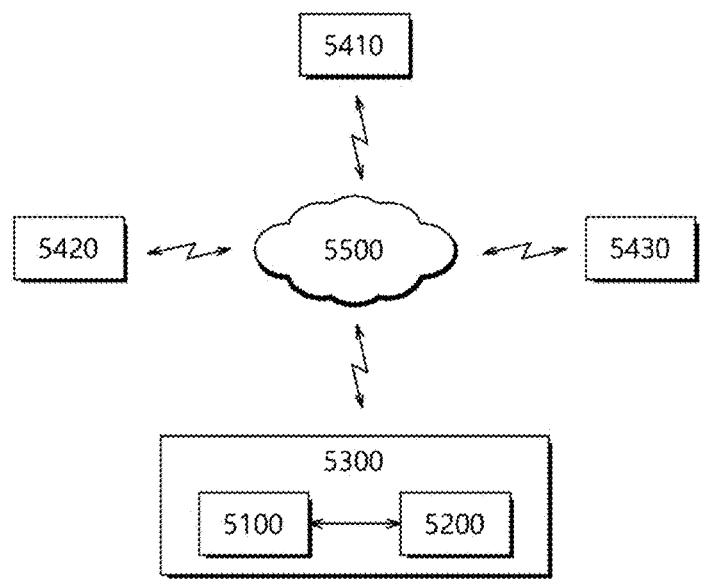
FIG. 13 is a diagram illustrating a network system including a memory system in accordance with an embodiment of the present disclosure.

FIG. 13 is a diagram illustrating an example of a network system 5000 including a memory system in accordance with an embodiment. Referring to FIG. 13, the network system 5000 may include a server system 5300 and a plurality of client systems 5410 to 5430 which are coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured of the memory system 10 illustrated in FIG. 1, the memory system 2200 illustrated in FIG. 9, the memory system 3200 illustrated in FIG. 11 or the memory system 4200 illustrated in FIG. 12.

Figure 14:
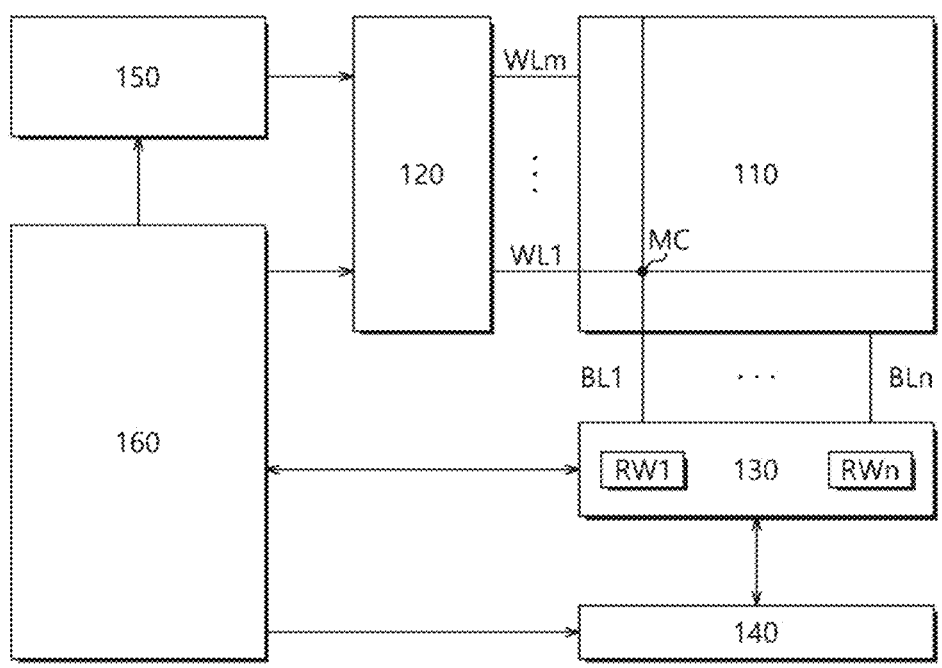
FIG. 14 is a block diagram illustrating a configuration of a nonvolatile memory device included in a memory system in accordance with an embodiment of the present disclosure.

FIG. 14 is a block diagram illustrating an example of a nonvolatile memory device included in a memory system in accordance with an embodiment. Referring to FIG. 14, the nonvolatile memory device 100 may include the memory cell array 110, a row decoder 120, a data read/write block 130, a column decoder 140, a voltage generator 150, and a control logic 160.

The memory cell array 110 may include the memory cells MC which are arranged in regions where the word lines WL1 to WLm and the bit lines BL1 to BLn cross each other.

The row decoder 120 may be coupled with the memory cell array 110 through the word lines WL1 to WLm. The row decoder 120 may operate according to control of the control logic 160. The row decoder 120 may decode addresses provided from an external device (not shown). The row decoder 120 may select and drive the word lines WL1 to WLm, based on the decoding results. For example, the row decoder 120 may provide word line voltages from the voltage generator 150, to the word lines WL1 to WLm.

The data read/write block 130 may be coupled with the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as a write driver which stores data provided from the external device, in the memory cell array 110 in a write operation. In another example, the data read/write block 130 may operate as a sense amplifier which reads out data from the memory cell array 110 in a read operation.

The column decoder 140 may operate according to control of the control logic 160. The column decoder 140 may decode addresses provided from the external device. The column decoder 140 may couple data input/output lines or data input/output buffers with the read/write circuits RW1 to RWn of the data read/write block 130 which respectively correspond to the bit lines BL1 to BLn, based on decoding results.

The voltage generator 150 may generate voltages to be used in internal operations of the nonvolatile memory device 100. The voltages generated by the voltage generator 150 may be applied to the memory cells MC of the memory cell array 110. For example, a program voltage generated in a program operation may be applied to a word line of memory cells on which the program operation is to be performed. In another example, an erase voltage generated in an erase operation may be applied to a well region of memory cells on which the erase operation is to be performed. In still another example, a read voltage generated in a read operation may be applied to a word line of memory cells on which the read operation is to be performed.

The control logic 160 may control an overall operation of the nonvolatile memory device 100, based on control signals provided from the external device. For example, the control logic 160 may control operations of the nonvolatile memory device 100 such as read, write, and erase operations of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A controller which controls a nonvolatile memory device, the controller comprising:
a first memory module configured to store a plurality of pieces of map data with a parity generated by an encoding operation;
a second memory module configured to include a memory error correction code engine performing the encoding operation on the plurality of pieces of map data read from the nonvolatile memory device, transmit the plurality of pieces of map data with the parity to the first memory module, receive at least one piece of map data among the plurality of pieces of map data from the first memory module, and store the at least one piece of map data; and
a processor configured to receive a read request from a host, obtain target map data corresponding to the read request from the first memory module, transmit the target map data to the second memory module, and transmit a signal including information about whether the target map data has locality using an available bit defined by an advanced extensible interface (AXI) protocol,
wherein the second memory module caches the target map data according to the information.

2. The controller of claim 1, wherein the second memory module caches the target map data when the target map data has at least one of temporal locality and spatial locality.

3. The controller of claim 1, wherein the second memory module does not cache the target map data received from the first memory module in a meta data write operation.

4. The controller of claim 1, wherein the first memory module is a dynamic random access memory (DRAM) module and the second memory module is a static random access memory (SRAM) module.

5. A memory system comprising:
a nonvolatile memory device; and
a controller configured to control the nonvolatile memory device,
wherein the nonvolatile memory device reads a plurality of pieces of map data stored therein and transmits the plurality of pieces of map data to the controller, and
wherein the controller includes:
a first memory module configured to store the plurality of pieces of map data with a parity generated by an encoding operation;
a second memory module configured to include a memory error correction code engine performing the encoding operation on the plurality of pieces of map data read from the nonvolatile memory device, transmit the plurality of pieces of map data with the parity to the first memory module, receive at least one piece of map data among the plurality of pieces of map data from the first memory module, and store the at least one piece of map data; and
a processor configured to receive a read request from a host, obtain target map data corresponding to the read request from the first memory module, transmit the target map data to the second memory module, and transmit a signal including information about whether the target map data has locality using an available bit defined by an advanced extensible interface (AXI) protocol, and
wherein the second memory module caches the target map data according to the information.

* * * * *